(12) United States Patent
Willershausen

(10) Patent No.: US 7,109,434 B2
(45) Date of Patent: Sep. 19, 2006

(54) DEVICE AND METHOD FOR SHORT CYCLE ARC WELDING

(75) Inventor: Jorg Willershausen, Wiesbaden (DE)

(73) Assignee: Newfrey LLC, Newark, DE (US)

( * ) Notice: Subject to any disclaimer, the term of this patent is extended or adjusted under 35 U.S.C. 154(b) by 169 days.

(21) Appl. No.: 10/606,309

(22) Filed: Jun. 25, 2003

(65) Prior Publication Data
US 2004/0056005 A1 Mar. 25, 2004

(30) Foreign Application Priority Data
Jun. 26, 2002 (DE) ................. 102 29 690

(51) Int. Cl.
*B23K 9/20* (2006.01)
(52) U.S. Cl. .......................... 219/98; 219/99
(58) Field of Classification Search ............ 219/98, 219/99
See application file for complete search history.

(56) References Cited

U.S. PATENT DOCUMENTS

| | | | |
|---|---|---|---|
| 3,293,402 A | 12/1966 | Graham | |
| 3,312,810 A | 4/1967 | Neumeier | |
| 3,339,799 A | 9/1967 | Spisak | |
| 3,694,611 A * | 9/1972 | Ettinger | 219/98 |
| 4,435,630 A | 3/1984 | Jordan | |
| 4,629,857 A | 12/1986 | Gauger | |
| 4,669,742 A | 6/1987 | Broszukat | |
| 5,317,123 A | 5/1994 | Ito | |
| 5,798,494 A * | 8/1998 | Aoyama et al. | 219/98 |
| 5,977,506 A | 11/1999 | von Daniken | |
| 6,015,962 A * | 1/2000 | Wiessler et al. | 219/98 |
| 6,239,401 B1 * | 5/2001 | McCardle et al. | 219/99 |
| 6,388,224 B1 * | 5/2002 | Torvinen | 219/99 |
| 6,559,406 B1 * | 5/2003 | Stepetic et al. | 219/98 |
| 2002/0153357 A1 | 10/2002 | Kurz et al. | |
| 2003/0019847 A1 | 1/2003 | Schmitt et al. | |
| 2003/0146193 A1 | 8/2003 | Kurz | |
| 2003/0217992 A1 | 11/2003 | Obermann | |
| 2004/0025331 A1 | 2/2004 | Schmitt et al. | |
| 2004/0037634 A1 | 2/2004 | Muller et al. | |

FOREIGN PATENT DOCUMENTS

| | | |
|---|---|---|
| DE | 32 18 886 C2 | 6/1984 |
| DE | 33 02 613 A1 | 8/1984 |
| DE | 88 01 452.5 U1 | 2/1988 |
| DE | 200 03 127 U1 | 2/2000 |
| GB | 2 130 133 A | 11/1984 |
| WO | WO 01/76800 | 10/2001 |

* cited by examiner

*Primary Examiner*—Len Tran
(74) *Attorney, Agent, or Firm*—Harness, Dickey & Pierce, P.L.C.

(57) ABSTRACT

A device and a method for short-cycle arc welding of elements (26) to components are disclosed, with a positioning mechanism (14) that holds a welding head (28) and can be positioned relative to a component (12), wherein the welding head (28) has a chucking mechanism (32) for holding an element (26), a linear motion mechanism (58) for advancing and retracting the chucking mechanism (32) relative to the welding head (28), and a feed channel (30) for feeding elements (26) to be welded into the chucking mechanism (32). The chucking mechanism (32) has radially movable chucking elements (34) that can be moved by a chucking means between an open position which permits axial passage of an element (26) from the feed channel (30) through the chucking device, and a chucking position in which an element (26) is chucked between the chucking elements (34).

41 Claims, 2 Drawing Sheets

DEVICE AND METHOD FOR SHORT CYCLE ARC WELDING

CROSS-REFERENCE TO RELATED APPLICATIONS

This application claims the benefit of German patent application DE 102 29 690.1, filed Jun. 26, 2002. The disclosure of the above application is incorporated herein by reference.

FIELD OF THE INVENTION

The invention relates to a device for short-cycle arc welding of elements, especially metal studs, to components, especially metal sheets, having a positioning mechanism that holds a welding head and can be positioned relative to a component, wherein the welding head has a chucking mechanism for holding an element, a linear motion mechanism for advancing and retracting the chucking mechanism relative to the welding head, and a feed channel for feeding elements to be welded into the chucking mechanism, wherein the chucking mechanism has radially movable chucking elements that can be moved by a chucking means between an open position, which permits axial passage of an element from the feed channel through the chucking device, and a chucking position, in which an element is chucked between the chucking elements.

The invention further relates to a method for short-cycle arc welding of elements, especially metal studs, to components, especially metal sheets, wherein an element to be welded is fed to the component through a feed channel and welded to the component.

BACKGROUND OF THE INVENTION

Such a device and such a method are known from DE 3 218 886 C1. In this context, the stud to be welded to a component is conveyed by compressed air through a feed channel through an elastically expandable chuck until it contacts a movable stud stop that is located on the workpiece side on the device housing in front of the chuck. The stud is positioned correctly in the chuck by the stud stop. To close the chuck, a tubular actuator is pushed onto the chuck toward the stop by a pneumatic working cylinder, wherein mutually corresponding angled ramps produce the radial closing motion. The chuck can be moved axially to a limited extent by motor drive, and in its movement to the welding position it pushes the movable stud stop to the side so that the stud is freed for welding. A disadvantage of the known method and the known apparatus is the long axial stroke of the chuck and the relatively complicated construction resulting from the movable stud stop.

In the prior art, the welding stroke motion in short cycle arc welding is generally performed by a linear motor drive, while the advancing motion of the welding head as a whole toward the component is generally performed by a pneumatic drive such as a cylinder. It is disadvantageous here, firstly, that no regulation of any sort can take place, and secondly, that lines for the compressed air must be routed through the cable assembly and through the welding head.

SUMMARY OF THE INVENTION

Consequently, the object of the invention is to create an improved apparatus and an improved method for short-cycle arc welding of elements to components with which simple and reliable feeding into a chuck of elements to be welded is ensured. This object is attained in a device of the aforementioned type in that the chucking mechanism in the open position forms a free passage for the elements to be welded that adjoins the feed channel and leads out of the welding head.

In the device according to the invention, a movable stud stop and a plunger for pushing a fed element into a resilient chuck are eliminated. In this way, the construction of the device is simplified significantly, and increased reliability is ensured. Since the chucking mechanism can be brought into the fully opened position during feeding of an element, wear of the chuck is significantly reduced in comparison to a conventional, resilient chuck. A further advantage of the device in accordance with the invention consists in that variation of the length, diameter and shape of elements to be welded is possible within certain limits with no need to change the chucking mechanism. In contrast, in conventional devices it is necessary to use an appropriate chuck in each case, particularly in the event of changes in the diameter of the elements to be welded. Moreover, blockage of the feed channel is largely precluded in the device according to the invention because there is no longer an additional channel opening into the feed channel. Finally, since the elements to be welded are conveyed directly to the component surface before they are chucked, significantly improved accuracy in positioning of the element to be welded relative to the component is ensured by the invention. Since the element to be welded rests directly on the surface of the component at the beginning of the welding process, this directly establishes a zero position from which the further position of the element can be controlled during the welding process. A support foot, such as is necessary in conventional short-cycle arc welding devices, can be eliminated entirely. Since the element to be welded contacts the component surface at the beginning of the welding process, this specifies a reference line which can be used as a basis for controlling the welding process.

In an advantageous refinement of the invention, the chucking mechanism has an axially movable clamping nosepiece that works together with the chucking elements to move them between the open and chucking positions. In this way, mechanical opening and closing of the chucking mechanism, which is to say movement between the open and chucking positions, is made possible with simple means. To this end, in a preferred refinement of the invention, the clamping nosepiece and the chucking elements can be coupled together by angled surfaces in order to convert axial displacement of the clamping nosepiece into a chucking or release motion of the chucking elements. An especially simple and reliable embodiment is made possible in this way.

In a preferred refinement of the invention, the clamping nosepiece is axially movable in the direction of the chucking elements in order to move into the chucking position. This embodiment has the advantage that the clamping nosepiece is removed from the surface of the component by the chucking motion, and hence accidental welding of the clamping nosepiece to the component is precluded.

In accordance with another feature of the invention, the clamping nosepiece acts with a conically shaped inner surface on outer angled surfaces on the chucking elements. To this end, the chucking elements are preferably designed to be self-centering. In this way, greater precision of the welding process is ensured as a result of the self-centering.

In another refinement of the invention, the chucking elements extend toward the clamping nosepiece in the approximate shape of a wedge and are movably retained by a clamping nut on their side facing away from the clamping nosepiece. Especially simple and reliable attachment is achieved in this way. In another embodiment of the invention, a drive, preferably a linear motor, is provided for bracing the clamping nosepiece against the chucking elements. In this way, the clamping force can be proportioned or determined, for example by means of the travel path. In addition, the travel path of the drive can be analyzed from the open position to the chucking position in order to detect the diameter of the chucked elements. Lastly, the elements can be chucked largely independently of their length.

Alternatively, a fluid cylinder can also be provided as the drive for moving the clamping nosepiece. A particularly economical embodiment is achieved by this means.

In a preferred refinement of the invention, a motor drive, preferably a linear motor, is provided on the linear motion mechanism for advancing and retracting the chucking mechanism. Especially when a linear motor is used as a drive for the clamping nosepiece and another linear motor is used on the linear motion mechanism to advance and retract the chucking mechanism, particularly wide variability in the welding process can be achieved, facilitating optimal adjustment for different welding tasks. Thus, for example, the thickness of the element to be welded can be detected by means of the travel path of the chucking mechanism's linear motor, and can be taken into account in the welding process. In addition, a position sensor can be provided for measuring the travel path of the chucking means of the chucking mechanism and/or the linear motion mechanism.

In another embodiment of the invention, a pressure sensor is provided to monitor the pressure inside the clamping mechanism, and the signal therefrom is supplied to an analysis unit for analysis in order to emit a signal that is characteristic of the feeding of an element to the component surface. In this way, when gas is continuously supplied to the feed channel, the change in pressure that arises when a fed element exits the feed channel and comes in contact with the component surface can be sensed in order to derive a signal therefrom that characterizes the arrival of an element. The reliability of the welding process is improved in this way.

In accordance with an alternative embodiment of the invention, a measurement voltage is applied between the chucking mechanism and the component, and is supplied to an analysis unit for analysis in order to emit a signal that is characteristic of the feeding of an element to the component surface. In this way as well, it is possible to obtain a signal that indicates the arrival at the component surface of an element to be welded, since the voltage signal is briefly affected by the arrival of an element at the component surface.

In an additional refinement of the invention, the feed channel is coupled through an intermediate storage to a storage device, whence are fed the elements to be welded. In this context, the intermediate storage is preferably separated from the workpiece opening of the chucking mechanism by a maximum distance of one meter, preferably a maximum of 0.5 m. This arrangement ensures that an overly great distance between the storage device and the component surface does not produce excessive kinetic energy of a fed element, which could lead to permanent deformation of the component.

In accordance with another embodiment of the invention, the intermediate storage has a chamber for accommodating an element to be welded that is closed by a pneumatic closure at each axial end. In this context, at least one sensor for stud length detection can be provided in the chamber.

Moreover, in accordance with another feature of the invention, a feed line for feeding gas into the chamber and an exhaust line for removing gas from the chamber, each of which is controllable by a valve, can open onto the chamber. Simple supply and removal of individual elements to and from the intermediate storage can be ensured in this way. The stud length detection ensures that elements with non-conforming lengths are not inadvertently welded onto the component.

Depending on the requirements of the welding process, protective gas can also be delivered through the feed line for feeding gas when an especially high-quality weld is desired. In the event of protective gas welding, another nosepiece can additionally be provided that surrounds the clamping nosepiece from outside. In this way, a certain amount of hollow space is achieved which surrounds the weld point and is under the influence of the protective gas.

With regard to the method, the object of the invention is attained through a method for short-cycle arc welding of elements, especially metal studs, to components, especially metal sheets, wherein an element to be welded is conveyed through a feed channel to a surface of the component, the element is chucked, and is then welded to the component.

Simple and reliable feeding of elements is ensured because, in accordance with the invention, each element to be welded is conveyed in this way directly to the surface of the component without being hindered by the chucking mechanism. Because an associated element is chucked by a chucking mechanism starting from a position on the component surface through a chucking motion in the chucking mechanism directed away from the surface of the component, inadvertent welding of the chucking device to the component surface is prevented.

In an additional refinement of the method in accordance with the invention, the element is conveyed to the component surface by gas pressure through a feed channel that opens into the chucking mechanism, and the element is chucked while the gas pressure continues to be maintained. In this way, simple and reliable feeding is ensured, and rebounding of the element is avoided by the continued presence of the gas pressure. In this context, the gas pressure in the vicinity of the opening of the feed channel into the chucking mechanism can be monitored and analyzed during a feed process in order to detect feeding and presence at the component surface of an element to be welded. Alternatively, a measurement voltage can be applied between the chucking mechanism and the component that is analyzed in order to detect feeding and presence at the component surface of an element to be welded. In an advantageous refinement of the method in accordance with the invention, the element to be welded is handled in a mechanically clamped chuck during the welding process. In accordance with another feature of the invention, the chuck is subjected to a testing force after completion of the chucking process. In this way, a test of the strength of the weld produced can be performed immediately after completion of the welding process.

Of course, the features mentioned above and those explained below can be used not only in the combinations specified, but also in other combinations or alone. Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional features and advantages of the invention are apparent from the description below of preferred example embodiments with reference to the drawings. Shown are.

DETAILED DESCRIPTION OF THE PREFERRED EMBODIMENTS

The following description of the preferred embodiments is merely exemplary in nature and is in no way intended to limit the invention, its application, or uses.

Figure 1:
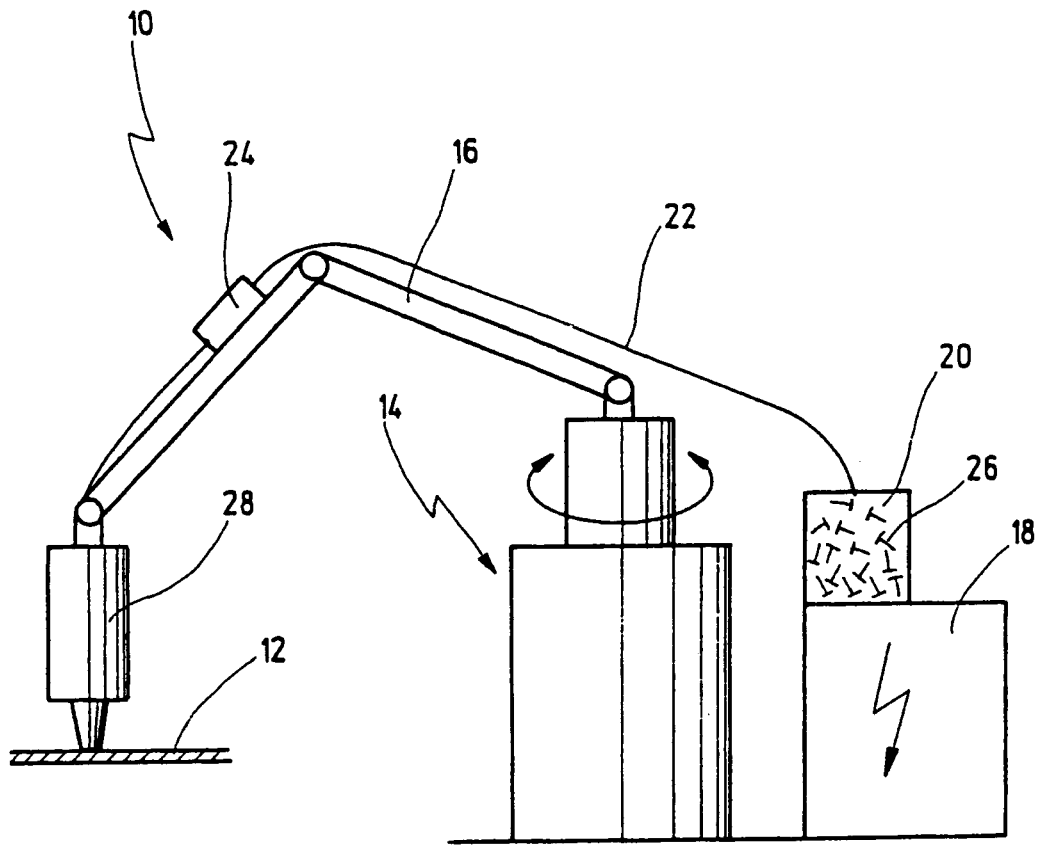
FIG. 1 is an extremely simplified schematic overall view of the device in accordance with the invention.

In FIG. 1, a device in accordance with the invention for short-cycle arc welding is shown in an extremely simplified schematic form, and labeled 10 overall. The device 10 has a welding head 28 that is accommodated on a bracket 16 of a positioning mechanism indicated schematically by the numeral 14. Generally, this is a robot, which has a robot arm, for example, that pivots about its vertical axis and is additionally divided into multiple links that are hinged to one another. If desired, linear guides may also be provided for moving the robot. The robot as a whole can perform movements in all three coordinate directions within a specified range of motion.

Provided at a distance from the welding head 28 is a power and control unit 18 by which means the welding device 28 is supplied with energy and controlled. A storage device 20 can be coupled to the power and control unit 18; elements 26 (studs) to be welded which are accommodated in said storage device can be fed by means of a suitable isolating device (not shown) through a line 22 and through an intermediate storage 24 to the welding head 28. If the welding head 28 is positioned suitably with respect to a component 12, an element accommodated therein can be welded to the component using the known short-cycle arc welding method.

Figure 2:
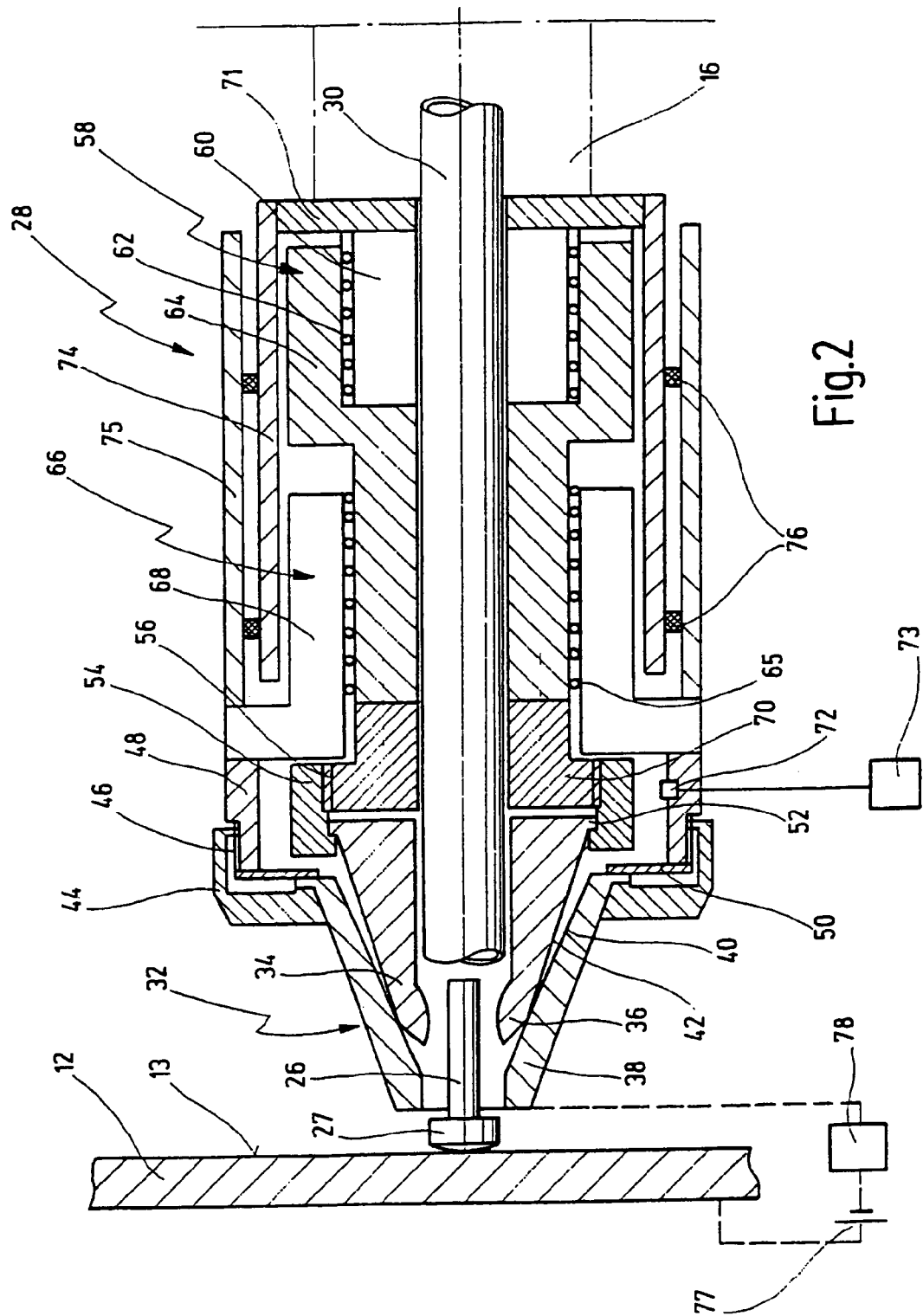
FIG. 2 is an enlarged longitudinal section through a welding head in accordance with the invention from FIG. 1.

As shown in FIG. 2, the welding head 28 has a chucking mechanism 32 for chucking elements 26 to be welded, onto which opens a feed channel 30, through which the elements 26 to be welded are fed by means of gas pressure. The chucking mechanism 34 has six chucking elements 34 extending toward the component 12 in the approximate shape of a wedge, each of which has at its outer end a tongue-shaped projection 36 that protrudes inward. The rear ends of the chucking elements 34 opposite the projections 36 are held at an outward-projecting circumferential shoulder 52 by means of a clamping nut 54 that is screwed onto a thread 56 of a receiving ring 70. The chucking elements 34 work together with a clamping nosepiece 38 that has a conical inner surface 40 which cooperates with the outer angled surfaces 42 of the chucking elements 34. Since the inner cone surface 40 of the clamping nosepiece 38 has a greater pitch than the angled surfaces 42 of the chucking elements 34, the chucking elements 34 can be moved radially inward at their outer ends or tongue-like projections 36 by an axial displacement of the clamping nosepiece 38 toward the chucking elements 34 while their inner ends are held in the clamping nut 54. An element 26 fed from the feed channel 30 between the chucking elements 34 can thus be chucked by axial movement of the clamping nosepiece 38 away from the component surface 13.

A linear motor 66 is provided to move the clamping nosepiece 38. The clamping nosepiece 38 is fastened to the armature 68 of the linear motor 66 by a clamping nut 44 that is screwed into a thread 46 of a receiving ring 48 and holds the clamping nosepiece 38 against a washer 50. In this way, the clamping nosepiece 38 can be advanced and retracted by moving the armature 68 of the linear motor 66 in the axial direction. The body of the linear motor 66 is constructed as a single piece with the body or traveler 64 of another linear motor 58 whose armature 60 is accommodated on a base element 71. The traveler enclosing the winding 62 of the linear motor 58 continues into the linear motor 66 and in this vicinity forms the body of the linear motor 66. The winding 65 enclosing the body 64 in this area is enclosed by the armature 68 of the linear motor 66. The latter can thus move relative to the body 64, thus simultaneously moving the clamping nosepiece 38 in the axial direction. The two linear motors 58, 66 together form a double-acting linear motor, which firstly facilitates chucking and releasing of the chucking mechanism 34, and secondly facilitates the advancing and retracting of the chucking mechanism 34 with respect to the component surface 13.

The receiving ring 70, to which the clamping nut 54 is fastened, is screwed to the end face of the body 64. The chucking elements 34 are thus movably attached to the body 64 at their inner ends, while the clamping nosepiece 38 can be moved relative thereto by means of the linear motor 66. A sleeve bearing guide 76 with strippers is provided to guide the clamping nosepiece 38 and the chucking elements 34. Said sleeve bearing guide is provided between an inner cylinder 74, which is rigidly connected to the base element 71 and externally encloses the two linear motors 58, 66, and an outer cylinder 75, which is rigidly connected to the armature 68 of the linear motor 66.

The base element 71 of the welding head 28 is connected to the bracket 16 of the positioning mechanism 14 or of the robot. The entire welding head 28 is passed through in the axial direction by the feed channel 30, which extends into the chucking mechanism 32 and ends approximately in the forward third of the longitudinal extent of the chucking elements 34.

Hence, elements 26 can be conveyed via gas pressure through the feed channel 30 all the way through the chucking mechanism 32 to the component surface 13. FIG. 2 shows such an element in the form of a stud that rests against the component surface 13 with its head 27.

At the start of a welding process, the welding head 28 is first positioned relative to the component 12 by means of the bracket 16. To this end, the welding head 28 can be advanced to the component surface 13 with the chucking mechanism 32 in the open position, for example, so that the end face of the clamping nosepiece 38 contacts the surface 13 of the component 12. If desired, a spring-loaded support foot, which is known in conventional short-cycle arc welding systems, can additionally be used to support positioning. However, it is also possible to do without such a support foot entirely. Now an element 26 to be welded can be conveyed through the feed channel 30 by means of gas pressure directly to the component surface 13 and then the chucking mechanism 32 can be chucked. Preferably the gas pressure continues to be maintained during this process to prevent rebounding of the element. For chucking, the clamping nosepiece 38 is pushed toward the receiving ring 70 so that the outer tongues 36 of the chucking elements 34 move inward and the element 26 is clamped between the tongue-like elements 36 while simultaneously being centered.

To monitor feeding of an element 26 to the component surface 13, a measurement voltage 77 can be applied between the clamping nosepiece 38 and the component 12 that is analyzed by an analysis unit 78. If the clamping nosepiece is initially in contact with the surface 13 of the component 12, then when an element 26 that is fed arrives, a short pulse is generated that can be analyzed by the analysis unit 78 to generate a control signal for the power and control unit 18 indicating that an element 26 has been fed and is resting against the component surface 13 ("stud arrival signal").

As an alternative, a sensor 72 can be provided that monitors the gas pressure within the chucking mechanism 32 and detects the pressure change that results when an element 26 exits the mouth of the feed channel 30 and strikes the component surface 13. The measurement signal from the pressure sensor 72 is in turn fed to an analysis unit 73 in order to generate a stud arrival signal.

Since the clamping nosepiece 38 is moved away from the component surface 13 during the chucking process, a certain distance always results between the mouth of the clamping nosepiece 38 and the component surface 13, which makes it impossible for the clamping nosepiece 38 to be welded to the component 12 in the event of a malfunction.

The clamping force of the chucking mechanism 32 can be monitored or controlled by means of the travel path of the linear motor 66. Furthermore, detection of the diameter of the element 26 to be welded can be achieved by monitoring the travel path of the linear motor 66. Since the element 26 to be welded is located directly on the component surface 13 in its initial position, precise positioning for the subsequent welding process is ensured, since all travel paths can be controlled with this position as a reference.

The actual stud welding process is performed in a manner known per se. In this context, a pilot current is applied to the element 26, if applicable after removing the measurement voltage 77. Then the element 26 is raised relative to the component 12 so as to draw an arc. After a certain height has been reached, the actual welding current is switched on, which raises the energy of the arc such that the head 27 of the element 26 and the associated location on the component 12 are melted. Subsequently, the linear motor 58 moves the element 26 back onto the component 12. As soon as electrical contact has been made again, the arc is short-circuited and the welding current is switched off.

In general, the advancing step takes place somewhat below the surface of component 34 so that good mixing of the molten materials on both sides takes place. Then all the molten material solidifies and the actual welding process is concluded. Then, if applicable, the chucking mechanism 32, still in the clamped state, can be subjected to a force directed away from the component 12 by the linear motor 58 in order to immediately test the strength of the weld produced. The clamping mechanism 32 is then moved back to the open position and the welding head 28 is moved by the robot to another welding location where an element to be welded can be fed, if applicable.

In order to prevent damage to the component 12 resulting from excessive kinetic energy of an element 26 that is fed, provision should be made to ensure that the length of the feed channel 30 does not exceed a certain maximum length. For example, a maximum value of 0.5 m is considered appropriate for this purpose. Moreover, an intermediate storage 24 can be arranged at this distance, into which individual elements 26 from the storage device 20 can be fed, and from which they can then be conveyed into the feed channel 30.

Figure 3:
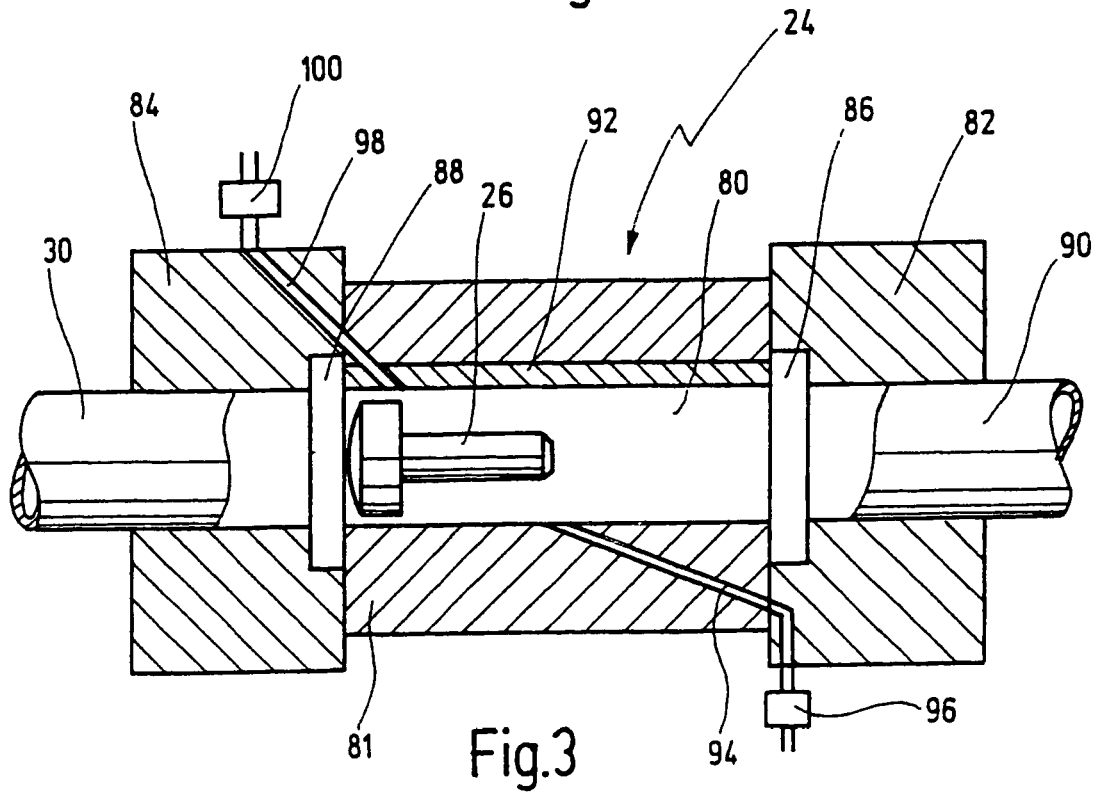
FIG. 3 is an enlarged longitudinal section from FIG. 1 taken through an intermediate storage.

A possible embodiment of such an intermediate storage 24 is described in detail below on the basis of FIG. 3. The intermediate storage 24 has a chamber 80 that is designed to accommodate one individual element 26 at a time. The chamber 80 is enclosed by a cylindrical housing 81 that is closed at both ends by connecting flanges 82 and 84. The feed channel 30 opens onto the connecting flange 84, while the connecting flange 82 is connected to the storage device 20 through a feed line 90, from which elements 26 are fed through an isolating device. The chamber 80 is sealed at each end by a gas-tight seal 86, 88 that is movable within the respective connecting flange 82 or 84. Moreover, a feed line for the passage of gas that is controlled by a valve mechanism 96 opens into the side of the chamber 80. Also opening into the side of the chamber 80 is an exhaust line 98 that is controlled by a valve mechanism 100.

The intermediate storage 24 functions such that, with the seal 86 initially open and the exhaust line 98 open, an element 26 is fed through the line 90 and strikes the seal 88. Then the seal 86 is closed, the exhaust line 98 is closed and gas is fed into the chamber 80 through the supply line 94, by which means the element 26 is conveyed through the feed channel 30 to the welding head 28 as a result of the gas pressure. In addition, as shown in FIG. 3, a sensor 92 for length detection can be provided in the wall of the housing 81. In this way, it is possible to ensure that elements 26 with a predetermined length are fed into the feed channel 30.

If desired, protective gas can be fed through the feed line 94 in order to permit inert gas welding. In this case, it is preferable to additionally use a protective gas nosepiece that encloses the clamping nosepiece 32 from the outside and extends approximately to the component surface 13 so as permit clean inert gas welds.

Since, in contrast to conventional resilient chucks, the chucking mechanism 32 is open during the feeding of elements 26 and thus permits practically unhindered passage of elements to the component surface 13, the wear on the clamping mechanism 32 is significantly less than with conventional chucks. If necessary, the clamping nosepiece 38 can be cleaned from time to time with a peg-like component to remove contaminants.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A device for short-cycle arc welding of an element to a component, the device comprising:
   a positioning mechanism;
   a welding head positionable relative to the component by the positioning mechanism, the welding head having a chucking mechanism operably holding the element, a motion mechanism operably advancing and retracting the chucking mechanism relative to the welding head; and
   a feed channel operably feeding the element to be welded into the chucking mechanism by use of gas pressure, at least a segment of the feed channel extending through the motion mechanism and being coaxially aligned with the chucking mechanism;
   the chucking mechanism being movable between an open position, which permits axial passage of the element from the feed channel through the chucking mechanism, and a chucking position, in which the element is chucked;

wherein the chucking mechanism in the open position creates a free passage for the element to be welded from the feed channel and out of the welding head;

the chucking mechanism further comprising an axially movable clamping nosepiece that works together with the chucking elements to move them between the open and chucking positions;

the chucking mechanism further comprising a plurality of angled surfaces operably coupling the clamping nosepiece and the chucking elements together in order to convert an axial displacement of the clamping nosepiece into one of a chucking and a release motion of the chucking elements;

the chucking elements having an approximate wedge shape and being extendable toward the clamping nosepiece; and a clamping nut locatable on a chucking element side facing away from the clamping nosepiece movably retaining the chucking elements.

2. The device of claim 1, further comprising a movable robotic arm and an element storage device mounted on the arm, the arm operably moving the welding head.

3. The device of claim 1, wherein the clamping nosepiece is movable toward the feed channel in order to move into the chucking position.

4. The device of claim 1, further comprising a conically shaped inner surface positionable on a plurality of outer angled surfaces on the chucking elements, the inner surface acting with the clamping nosepiece.

5. The device of claim 1, wherein the chucking elements further comprise a plurality of self-centering chucking elements.

6. The device of claim 1, comprising a drive operably bracing the clamping nosepiece against the chucking elements.

7. The device of claim 6, wherein the drive comprises a linear motor.

8. The device of claim 6, wherein the drive comprises a fluid cylinder.

9. The device of claim 1, further comprising a linear motor provided on the motion mechanism operably advancing and retracting the chucking mechanism.

10. The device of claim 1, further comprising a pressure sensor provided to monitor a pressure inside the clamping mechanism, a signal therefrom being provided to an analysis unit for analysis in order to emit a signal that is characteristic of the feeding of the element to a surface of the component.

11. The device of claim 1, further comprising a measurement voltage applicable between the chucking mechanism and the component, the measurement voltage suppliable to an analysis unit for analysis in order to emit a signal that is characteristic of the feeding of the element to a surface of the component.

12. A device for short-cycle arc welding of an element to a component, the device comprising:
a positioning mechanism;
a welding head positionable relative to the component by the positioning mechanism, the welding head having a chucking mechanism operably holding the element, a motion mechanism operably advancing and retracting the chucking mechanism relative to the welding head;
a feed channel operably feeding the element to be welded into the chucking mechanism;
the chucking mechanism being movable between an open position, which permits axial passage of the element from the feed channel through the chucking mechanism, and a chucking position, in which the element is chucked;
wherein the chucking mechanism in the open position creates a free passage for the element to be welded from the feed channel and out of the welding head;
an intermediate storage; and
a storage device;
wherein the feed channel is coupled through the intermediate storage to the storage device, the storage device feeding the elements to be welded.

13. The device of claim 12, comprising a maximum distance of one meter separating the intermediate storage from the workpiece opening of the chucking mechanism.

14. The device of claim 12, comprising a maximum distance of 0.5 meters separating the intermediate storage from the workpiece opening of the chucking mechanism.

15. The device of claim 12, comprising:
a chamber of the intermediate storage for accommodating an element to be welded, the element having closed axial ends; and
a plurality of pneumatic closures operable to close the closed axial ends.

16. The device of claim 15, comprising at least one sensor for stud length detection provided in the chamber.

17. The device of claim 15, comprising a feed line for feeding a gas into the chamber and an exhaust line for removing the gas from the chamber, each of which is controllable by a valve open onto the chamber.

18. An arc welding system comprising:
a welding head positionable relative to a workpiece, the welding head having a chucking mechanism engageably holding an element, a first linear actuator operable to radially open and close the chucking mechanism, and a second linear actuator operable to advance and retract the chucking mechanism relative to the welding head; and
a feeding channel extending through both of the actuators;
the chucking mechanism including a plurality of radially movable chucking elements, each radially displaceable in response to an axial displacement of the first linear actuator between an open position, permitting free axial passage of the element through the chucking device, and a chucking position, having the element chucked between the chucking elements;
wherein after the element passes freely through the chucking device and contacts the workpiece, and the first linear actuator displaces in a first axial direction to position the chucking elements in the chucking position, the second linear actuator subsequently displaces longitudinally in a second axial direction toward the workpiece, opposite the first axial direction, and advances the element for welding.

19. The arc welding system of claim 18, comprising a conical nosepiece connectable to the first linear motion mechanism, the conical nosepiece positionable to directly contact the chucking elements to radially displace the chucking elements upon displacement of the first linear motion mechanism in the first direction.

20. An arc welding machine, comprising:
a welding head having a chucking mechanism operably holding one of a plurality of elements to be welded, a first motion mechanism operable to radially open and close the chucking mechanism, and a second motion mechanism operably advancing and retracting the chucking mechanism relative to the welding head;
a positioning mechanism remote from the welding head to position the welding head;
a movable robotic arm member joining the welding head to the positioning mechanism;
a storage chamber secured to and always moving with the robotic arm member, when the member moves, the storage chamber being operable to temporarily store individual ones of the elements to be welded; and
a feed channel providing the element to the welding head, the feed channel being in communication with the storage chamber.

21. The machine of claim 20, comprising a storage device positionable remote from both the welding head and the storage chamber, the storage device operable to store for transfer to the storage chamber the elements to be welded.

22. The machine of claim 21, comprising a feed line linking the storage device to the storage chamber.

23. A welding head for engaging individual items, the welding head comprising:
a chucking mechanism operable to hold one of the items, the chucking mechanism including a plurality of radially movable chucking elements;
a first electromagnetic mechanism operable to radially open and close the chucking mechanism;
a substantially conical-shaped nosepiece connectable to the first mechanism, the nosepiece positionable in direct contact with the chucking elements to radially displace the chucking elements;
a second electromagnetic mechanism operable to longitudinally advance and retract the nosepiece; and
a feed channel disposed through the welding head and through at least one of the electromagnetic mechanisms to deliver the items to the chucking mechanism.

24. The welding head of claim 23, further comprising:
an inner cylinder connectable to the second mechanism;
an outer cylinder connectable to the first mechanism, the outer cylinder positioned external to the inner cylinder; and
at least one sleeve bearing positioned between the inner and outer cylinders to permit a sliding engagement of the inner cylinder and the outer cylinder.

25. The welding head of claim 23 further comprising:
a workpiece;
the items including a weld stud; and
a controller connected to at least one of the electromagnetic mechanisms, the controller automatically controlling at least one of the electromagnetic mechanisms to subsequently cause the chucking mechanism to apply a pulling force on the weld stud in a direction away from the workpiece to which it has been welded, in order to test the weld strength.

26. The welding head of claim 23 further comprising:
an analysis unit operably monitoring welding element-clamping force of the chucking mechanism as a function of a characteristic of at least one of the electromagnetic mechanisms.

27. The welding head of claim 23 further comprising:
a feeder adapted to move the items to the chucking mechanism by use of gas pressure; and
a sensor operably monitoring the gas pressure adjacent the chucking mechanism.

28. The welding head of claim 23 wherein the chucking mechanism comprises an axially movable clamping nosepiece that works together with the chucking elements to move them between the open and chucking positions.

29. The welding head of claim 28 further comprising:
the chucking elements having an approximate wedge shape and being extendable toward the clamping nosepiece; and
a clamping nut locatable on a chucking element side facing away from the clamping nosepiece for movably retaining the chucking elements.

30. The welding head of claim 23 comprising:
an intermediate storage;
a storage device; and
a feed channel coupled through the intermediate storage to the storage device, the storage device feeding the elements to be welded.

31. An arc welding system comprising:
a workpiece;
a weld stud;
a feeding tube;
a welding head including chucking members movable from a welding stud-engaging position to an open position; and
gas pressure causing the weld stud to sequentially move through the feeding tube, through at least part of the welding head and at least partially extending external to the welding head;
wherein the weld stud contacts against the workpiece prior to engagement by the chucking members and at least part of the weld stud remains within the nosepiece before chucking.

32. An arc welding system comprising:
chucking members movable from a weldable member-engaging position to an open position;
a first electromagnetic actuator operably moving the chucking members;
a nosepiece located adjacent the chucking members, the nosepiece having an opening adapted to allow weldable element-passage therethrough; and
a second electromagnetic actuator operably advancing and retracting the nosepiece substantially independently of the chucking members;
wherein the nosepiece is retractable away from a workpiece position before the chucking members are in their fully engaging positions.

33. The system of claim 18 wherein the actuators are electromagnetic actuators and the feeding channel is coaxially aligned with the chucking mechanism.

34. The system of claim 18 wherein the actuators are coaxially aligned with each other.

35. The system of claim 18 further comprising weld studs fed through the channel, and the channel being a separate and substantially tubular part coupled to the welding head.

36. The system of claim 31 wherein the welding head further comprises at least two linear electromagnetic actuators, one of the actuators moving the nosepiece and the other of the actuators closing the chucking members.

37. The system of claim 32 further comprising:
a workpiece;
the element including a weld stud; and
a controller connected to at least one of the electromagnetic actuators, the controller automatically controlling at least one of the electromagnetic actuators to subsequently cause the chucking members to apply a pulling force on the weld stud in a direction away from the workpiece to which it has been welded, in order to test the weld strength.

38. The system of claim 32 further comprising:

an analysis unit operably monitoring weldable element-clamping force of the chucking members as a function of a characteristic of at least one of the electromagnetic actuators.

39. The system of claim 32 further comprising:

a feeder moving the weldable element to the chucking members by use of gas pressure; and a sensor operably monitoring the gas pressure adjacent the chucking members.

40. The system of claim 32 further comprising:

the chucking member having an approximate wedge shape and being extendable toward the nosepiece; and a clamping nut locatable on a chucking member side facing away from the nosepiece for movably retaining the chucking members.

41. The system of claim 32 comprising:

a movable intermediate storage;

a stationary storage device; and a feed channel coupled through the intermediate storage to the storage device, the storage device feeding the element to be welded.

\* \* \* \* \*